United States Patent [19]

Kyuma et al.

[11] Patent Number: 5,504,884
[45] Date of Patent: Apr. 2, 1996

[54] INFORMATION RETRIEVAL SYSTEM

[75] Inventors: Kazuo Kyuma; Shuichi Tai; Masaya Oita, all of Hyogo; Nagaaki Ohyama, Kanagawa; Masahiro Yamaguchi, Tokyo, all of Japan

[73] Assignee: Mitsubishi Denki Kabushiki Kaisha, Tokyo, Japan

[21] Appl. No.: 14,253

[22] Filed: Feb. 5, 1993

[30] Foreign Application Priority Data

Feb. 21, 1992  [JP]  Japan .................................. 4-070065

[51] Int. Cl.$^6$ ................................................ G06F 15/17
[52] U.S. Cl. .......................................... 395/600; 365/49
[58] Field of Search ....................... 382/14, 15; 395/600; 365/49

[56] References Cited

U.S. PATENT DOCUMENTS

| | | | |
|---|---|---|---|
| 5,023,833 | 6/1991 | Baum et al. | 365/49 |
| 5,095,459 | 3/1992 | Ohta et al. | 395/25 |
| 5,274,714 | 12/1993 | Hutcheson et al. | 382/15 |
| 5,295,197 | 3/1994 | Takenaga et al. | 382/14 |

OTHER PUBLICATIONS

X. Lu et al., "The Performance of Intelligent Associative Memory", *Extended Abstracts*, published by the Japan Society of Applied Physics and Related Societies, The 38th Spring Meeting, pp. 864 (31p-A-10).
M. Oita et al., "A Proposal of Intelligent Associative Memory System (3)", *Extended Abstracts*, published by the Japan Society of Applied Physics, The 52nd Autumn Meeting, 1991, pp. 820 (9a-ZH-7).
M. Yamaguchi et al., "Creativity in Neural Network" published by the Japan Society of Applied Physics, The 52nd Autumn Meeting, 1991, pp. 818 (9a-ZH-1).
T. Kondoh et al., "Data Retrieval by Mutual Connected Neural Networks", published by the Japan Society of Applied Physics and Related Societies, The 39th Spring Meeting, 1992, pp. 820 (29p-B-8).
M. Oita et al., "Word Recognition by Using Modular Neural Networks", *Proceedings of the 1992 IEICE Spring Conference*, Part 6: Information and Systems, published by the Institute of Electronics, Information and Communication Engineers, pp. 6-68.
Xuenong Lu et al., "The Optical Implementation of an Intelligent Associative Memory System", *Optics Communications* vol. 90, No. 1, 2, 3, (North–Holland, Jun. 1, 1992), pp. 165–172.
M. Yamaguchi et al., "A Proposal of Intelligent Associative Memory Systems", *Extended Abstracts*, published by the Japan Society of Applied Physics, The 51st Autumn Meeting, 1990, pp. 807 (28a-H-2).
M. Oita et al., "A Proposal of Intelligent Associative Memory System (2)", *Extended Abstracts*, published by the Japan Society of Applied Physics and Related Societies, The 38th Spring Meeting, 1992, pp. 863 (31p-A-9).
"Bit(a Japanese publication by Kyoritsu Publishing Co., Ltd.)", vol. 23, No. 9, pp. 1297–1309 (1991).

*Primary Examiner*—Thomas G. Black
*Assistant Examiner*—Cheryl R. Lewis
*Attorney, Agent, or Firm*—Burns, Doane, Swecker & Mathis

[57] ABSTRACT

An information retrieval system allowing the user to build a database or to retrieve data therefrom based on vague retrieval-designating data without becoming aware of the database structure. The system comprises a neural network, a memory, an interface part and a CRT. The neural network stores data designating electronic still pictures contained in the memory. When data for designating retrieval are input, the interface part groups the data into such categories as the place where the desired picture was taken and the date on which it was taken, and supplies the neural network with the categorized input data. In turn, the neural network outputs by association the data corresponding to the input data. Given the data from the network, the memory outputs the relevant electronic still picture to the CRT for display.

6 Claims, 5 Drawing Sheets

INFORMATION RETRIEVAL SYSTEM

BACKGROUND OF THE INVENTION

1. Field of the Invention

The present invention relates to an information retrieval system that retrieves necessary information from a database.

2. Description of the Prior Art

Prior art database models include hierarchical and network type databases. The prior art relevant to the invention will now be described in connection with a typical hierarchical database.

FIG. 1 is a view showing the data structure of a typical hierarchical database discussed illustratively in "Bit" (a Japanese publication by Kyoritsu Publishing Co., Ltd.), Vol. 23, No. 9, pp. 1297-1308 (1991). As indicated in FIG. 1, the relations between data constitute a tree structure. At the top of the tree structure is a root node followed downward by child nodes which in turn are followed by their child nodes, and so on.

In FIG. 1, reference characters $1a$ through $1h$ are record types. The uppermost record type $1a$ is the root. FIG. 1 shows eight record types $1a$ through $1h$. A line between any two of the record types $1a$ through $1h$ indicates the existence of a parent-child relation therebetween.

The constraints on the tree structure include the following:

(1) Each defined tree structure should have one root record.

(2) There should be only one parent record for a given record type.

The order of the record types $1a$ through $1h$ in such a tree structure is associated closely with the physical structure of the database. That is, data are reached by sequentially following the record type order $1a$ through $1h$. When using an information retrieval system based on a tree structure database, the user must describe desired data in a sequence that complies with the physical record type order of the database. Otherwise, it would take an inordinately long time to retrieve any desired data from the system.

As described above, given such prior art information retrieval systems, users are obliged to describe desired data under constraints of the physical relations between the data constituting the database of each system. The task of describing the data to be retrieved in the above manner is a tedious, time-consuming chore.

In a more specific example of information storage and retrieval, printed photographs are traditionally put in order when they are suitably arranged in albums or the like together with user-written descriptions of the date and place associated with each photo. Such orderly arrangement of photos typically involves having to develop and print each roll of film every time it is finished with all its picture frames taken. Subsequent retrieval of a desired picture can be quite a challenge if there are a large number of pictures stored more or less haphazardly. These annoying aspects of information storage and retrieval have often proved to be characteristic of the prior art.

In this connection, storage of image information in the form of electronic still pictures is drawing attention today. Electronic still pictures are made of image information entered through an image input device such as CCD (charge coupled device) for storage onto such recording media as magnetic tapes and magnetic or optical discs. The stored information is later retrieved for reproduction on a CRT screen (e.g., TV screen) or as hard copy. Unlike conventional pictures, the contents of such image information cannot be verified visually. This inconvenience contrasts with the ability of electronic still picture systems to store and retrieve large quantities of image information efficiently.

Conventional database management techniques could be applied to the data retrieval of electronic still pictures. However, general users cannot be expected to build a sophisticated database on their own just for the sake of retrieving desired pictures. What is needed is an information retrieval system that dispenses with traditional database retrieval techniques when the database of the system is accessed directly by the user. The system should be constructed in such a manner that the user may readily retrieve desired data therefrom by feeding simple retrieval data thereto.

SUMMARY OF THE INVENTION

In view of the foregoing, it is an object of the present invention to provide an information retrieval system which allows users to gain easier access to a database for information retrieval while not requiring strict rules on how to describe desired data to be retrieved.

In achieving the above and other objects of the present invention and according to a first aspect thereof, there is provided an information retrieval system comprising: input means for admitting input information for designating retrieval; conversion means for categorizing the input information and for converting the categorized information into input data in bit strings; an input layer for admitting the bit strings; an output layer for outputting output data indicating those data in the database which correspond to the input information; and a neural network for changing, during a learning process, the weight of connection between the input and the output layers when the input data are admitted into the input layer.

According to a second aspect of the present invention, there is provided an information retrieval system comprising: input means for admitting input information for designating retrieval; conversion means for categorizing the input information and for converting the categorized information into input data in bit strings; an input layer for admitting the bit strings; an output layer for outputting a plurality of candidates of output data indicating those data in the database which correspond to the input information; and a neural network for changing, during a learning process, the weight of connection between the input and the output layers when the input data are admitted into the input layer.

In the information retrieval system stated above, the neural network according to the invention makes it possible, when user-entered data for designating retrieval are vague, to output those data from the database which correspond optimally to the retrieval-designating data.

Furthermore, the neural network according to the invention makes it possible, when user-entered data for designating retrieval are vague, to output a plurality of candidates of those data from the database which correspond optimally to the retrieval-designating data.

The above and further objects and novel features of the invention will more fully appear from the following detailed description when the same is read in connection with the accompanying drawings. It is to be expressly understood, however, that the drawings are for purposes of illustration only and are not intended as a definition of the limits of the invention.

DETAILED DESCRIPTION OF THE PREFERRED EMBODIMENTS

Preferred embodiments of the invention will now be described in detail referring to the accompanying drawings. The description will center primarily on how electronic still pictures are retrieved from a database by use of the invention.

First Embodiment

Figure 1:
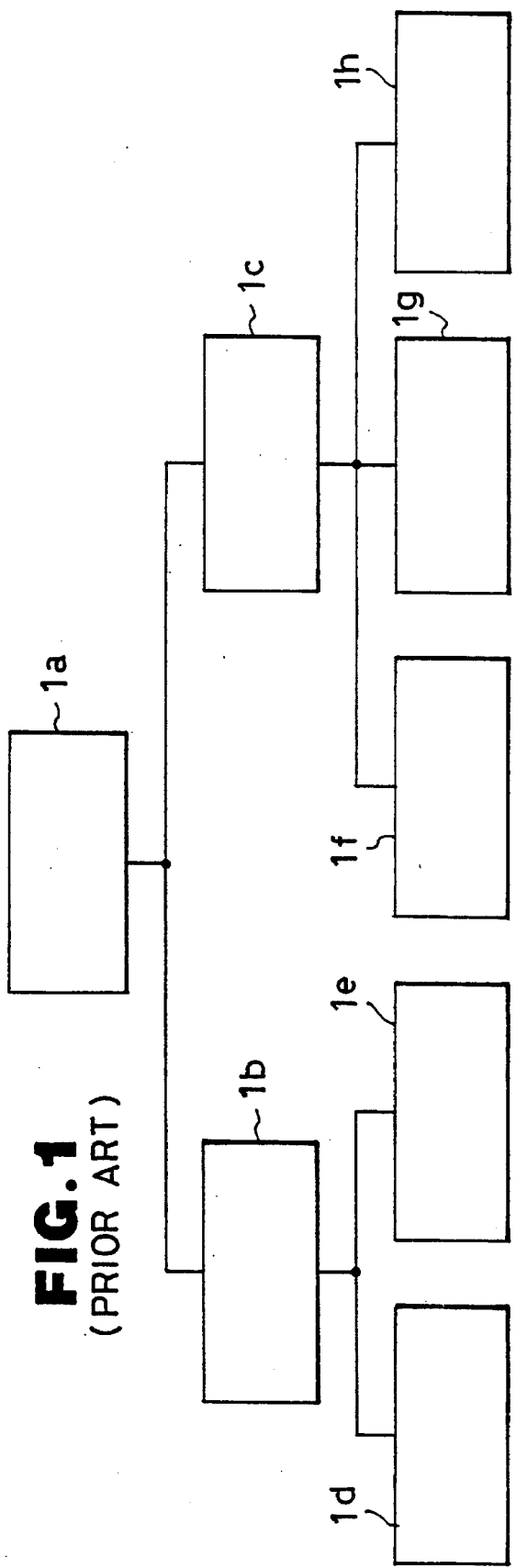
FIG. 1 is a view showing a typical data structure of a prior art database.
Figure 2:
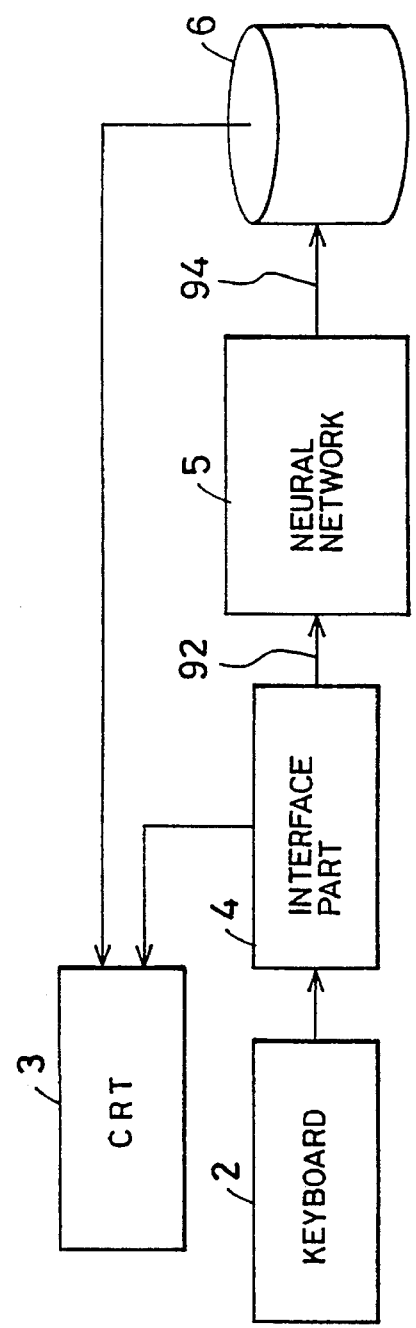
FIG. 2 is a block diagram of an information retrieval system practiced as a first embodiment of the invention.

FIG. 2 is a block diagram of the first embodiment of the invention. In FIG. 2, reference numeral 2 is a keyboard (input means) with which the user enters input information; 3 is a CRT which displays a menu prompting the user to enter input data and which also displays an electronic still picture upon retrieval; 4 is an interface part (conversion means) which causes the menu to appear on the CRT 3 and which converts the input data into bit information; 5 is a neural network that outputs the picture number of the electronic still picture corresponding to the input information; and 6 is a memory (database) that stores electronic still pictures.

Figure 3:
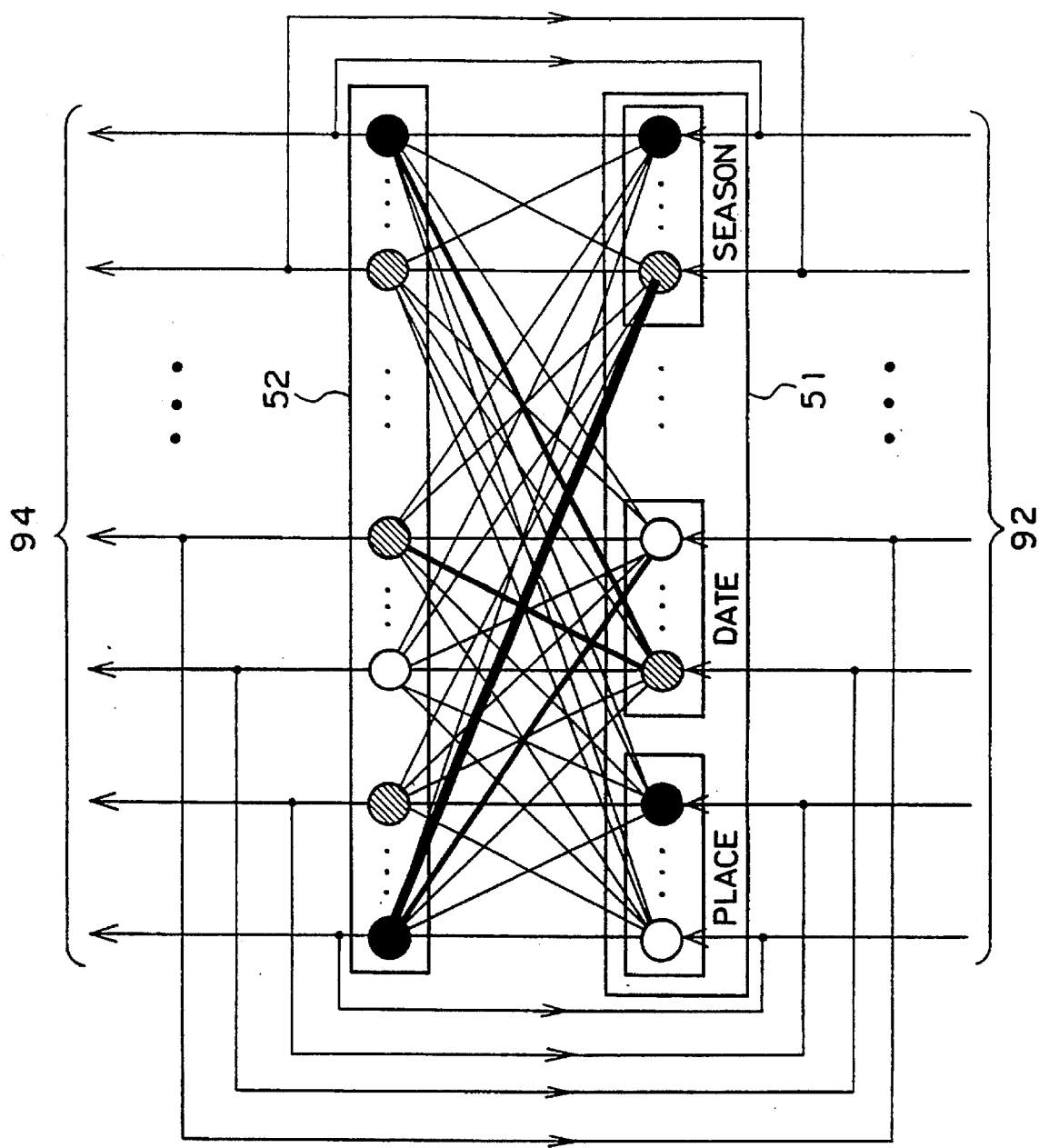
FIG. 3 is a view describing a typical neural network constitution in connection with the invention.

Also in FIG. 2, reference numeral 92 represents input data given to the neural network 5. Illustratively, as shown in FIG. 3, such items of information as the place, time, weather, persons photographed, and the season regarding a desired picture are provided as the input data in a predetermined number of bits. Reference numeral 94 stands for output data corresponding to the number of the picture retrieved accordingly.

FIG. 3 is a view describing a typical constitution of the neural network 5. In FIG. 3, reference numeral 51 is an input layer for admitting the input data; and reference numeral 52 is an output layer whose various output neurons are connected to diverse input neurons of the input layer 51.

Figure 4:
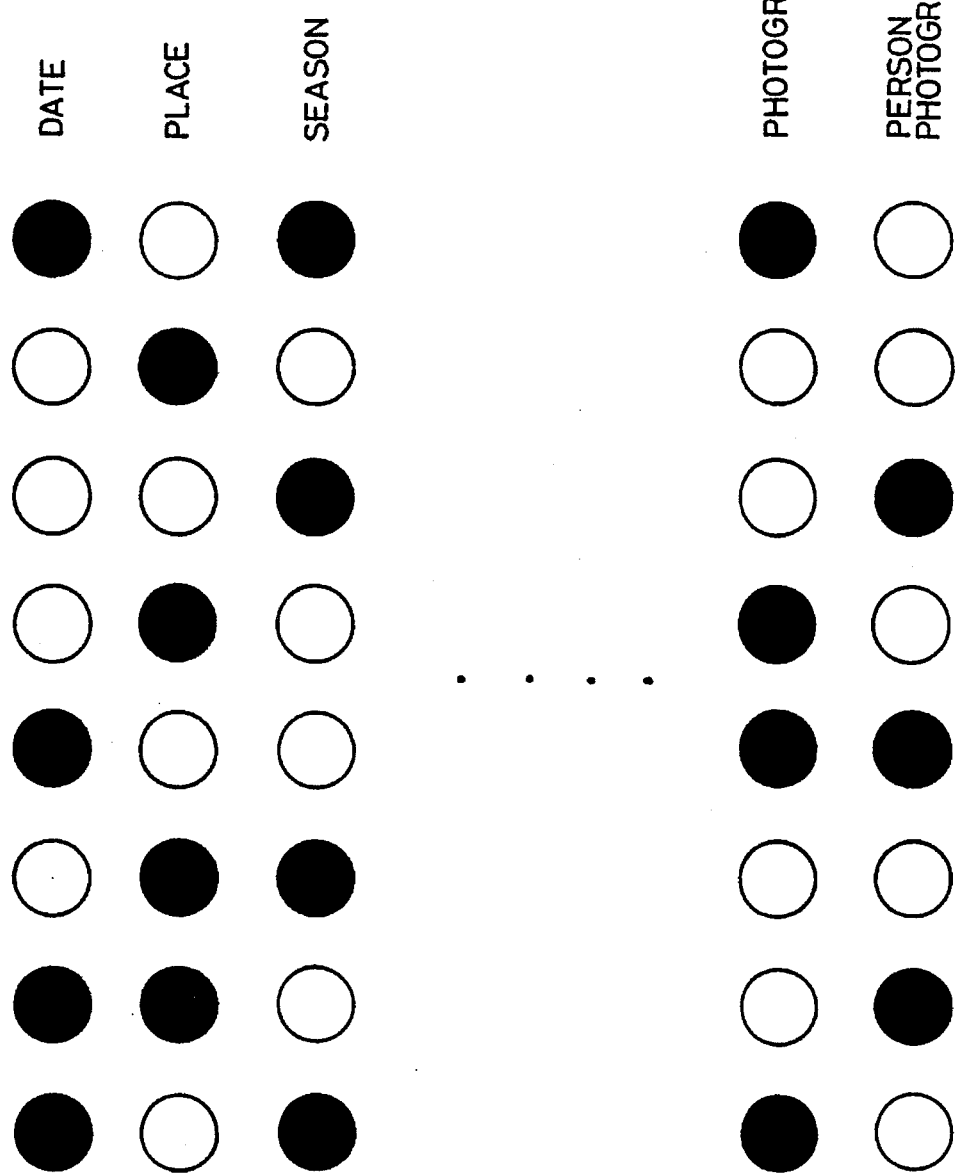
FIG. 4 is a view of typical data in connection with the invention.

Operation will be described below. The first embodiment works as follows: a user might want to have a look at a certain picture stored in the memory 6. In this case, the user enters the date on which the picture was taken and other relevant information by following the input menu displayed on the CRT 3. The interface part 4 first groups these items of information into such categories as the date on which the picture was taken, the place where the picture was taken, the person whose picture was taken, and other categories. The interface part 4 then converts these items of information into bit-based information in order to create input data, as depicted in FIG. 4. In turn, the input data are fed to the neural network 5. In FIG. 4, each black circle represents a 1 (alternatively, each hollow circle may be regarded as a 1).

The neural network 5 has a learning capability. This capability may be implemented on the basis of what is known as the perceptron (regarded as a dual layer back propagation network). Illustratively, at the time of learning, the degree of connection between input and output neurons is varied in such a manner that the output data keyed to given input data will become the desired data (i.e., number of the picture that best fits the meaning indicated by the input data).

Specifically, the difference between the current output data and the desired data (i.e., teacher signal) is fed back as a learning signal to the input layer 51. The degree of connection between input and output neurons is varied so that the output data will approach the teacher signal. Then the output data corresponding to the input data are stored into the neural network 5.

Thereafter, the user inputs various items of information about the desired picture. In response, the neural network 5 outputs the number of the picture corresponding to the input information. Even if a few items of information are lacking upon data entry by the user, the neural network 5 selects and outputs the number of the best fit picture by means of association.

For example, the user may have forgotten when the picture was taken but does remember it was taken in, say, Osaka in the company of Mr. A. In such a case, the user inputs only the known pieces of information. At this point, the bit information entered into the input layer 51 of the neural network 5 is incomplete. Nevertheless, the output layer 52 outputs the number of the picture associated with the known information.

It is also possible to introduce degrees of likelihood regarding the input information for designating retrieval. Illustratively, the CRT 3 is used to display a menu regarding the likelihood of information. The user then inputs the degree of likelihood for each item of information. For example, the user may be 100 percent certain that the place where the picture was taken is Osaka, thus designating the 100 percent likelihood for Osaka accordingly. In turn, the interface part 4 puts the weight of that input at 1.0. If the user is not absolutely sure of the season when the picture was taken but thinks it was probably summer, the user specifies the likelihood through the keyboard 2. In response, the interface part 4 puts the weight of that input at, say, 0.5.

The neurons in the input layer 51 are each given a weight of input as the degree of excitation assigned thereto. For example, the input layer 51 is constituted so that an input layer neuron supplied with a weight of 1.0 will output 1.0 and that an input layer neuron fed with a weight of 0.5 will output 0.5. The associating capability built in the neural network 5 causes the output layer 52 to output the number of the picture that best fits the user-input information.

The picture number output by the neural network 5 is sent to the memory 6. In turn, the memory 6 supplies the CRT 3 with the picture information designated by that picture number.

Second Embodiment

Figure 5:
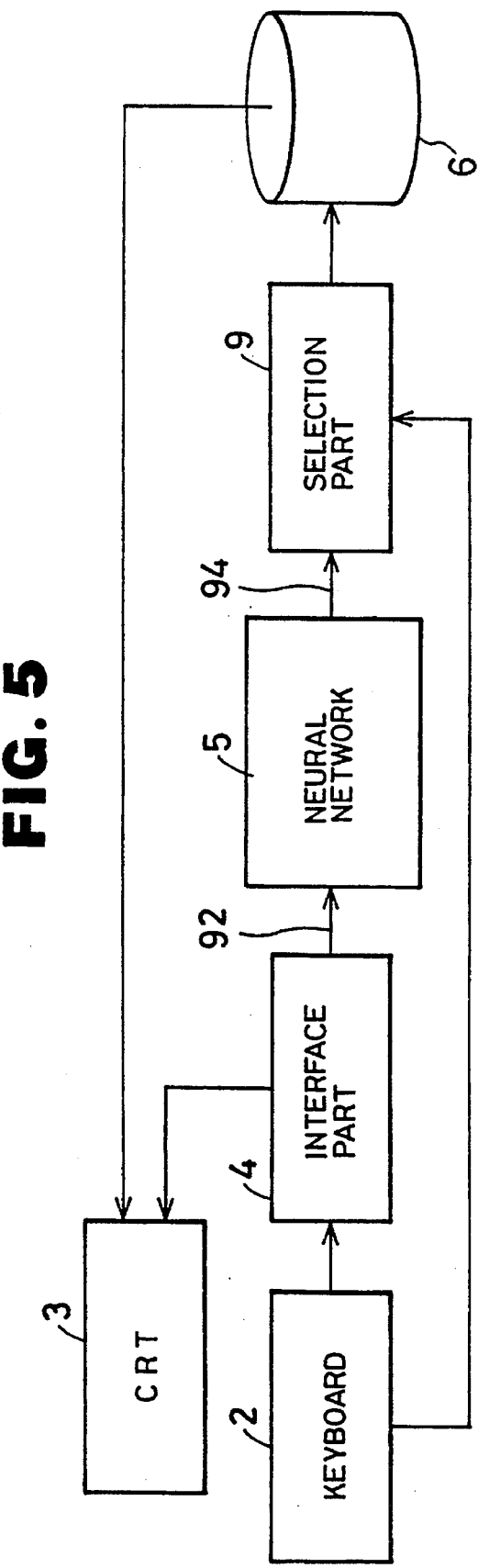
FIG. 5 is a block diagram of an information retrieval system practiced as a second embodiment of the invention.

FIG. 5 is a block diagram of an information retrieval system practiced as the second embodiment of the invention. In FIG. 5, reference numeral 9 is a selection part that selects the numbers of the pictures desired by the user, one after another, from the data output by the neural network 5.

The second embodiment works as follows: the neural network 5 performs learning as in the case of the first embodiment. Thereafter, the neural network outputs data in accordance with the input information. The selection part 9 selects the output data of the largest value, i.e., the number of the picture that is most likely to be the one desired. The selected picture number is sent to the memory 6. In the same manner as with the first embodiment, the picture of the highest likelihood is then displayed on the CRT 3.

If the displayed picture is not what is desired, the user inputs through the keyboard 2 a request for the picture of the next highest likelihood. In response, the selection part 9 selects the output data of the next largest value from those output by the neural network 5. This is the number of the picture having the next highest likelihood. The newly selected picture number is sent to the memory 6, and the selected picture is displayed on the CRT 3.

If the displayed picture is not yet what is desired, the user again inputs through the keyboard 2 another request for the picture of the next highest likelihood. The selection part 9 selects the output data of the next largest value and outputs the number of the picture having the next highest likelihood. The process is repeated until the user obtains the desired picture.

As a variation of the second embodiment, the selection part 9 may be arranged to select a plurality of picture numbers corresponding to the pictures of the descending order of likelihood. These pictures may be displayed simultaneously and in a scaled-down format on the CRT 3 so that the user may pick the one desired.

Third Embodiment

A third embodiment of the invention may be devised which has an additional ability automatically to determine whether the output data truly correspond to the information desired by the user. This embodiment involves adding a data retrieval network to the neural network 5 of the second embodiment, as illustrated in FIG. 6.

Figure 6:
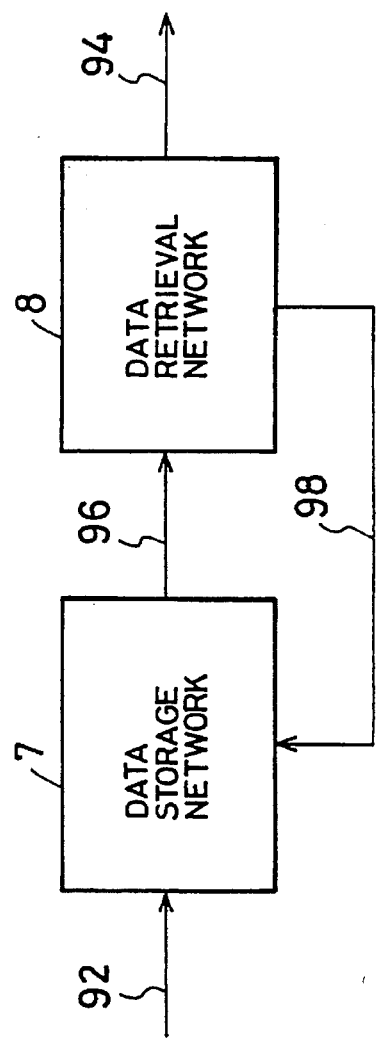
FIG. 6 is a partial block diagram of a third embodiment of the invention having a revised neural network of the second embodiment of FIG. 5.

In FIG. 6, reference numeral 7 is a data storage network of the same structure as that in FIG. 3; 8 is a data retrieval network; 92 is input data; and 96 is the data output by the data storage network 7. The data 96 do not represent a picture number but are data obtained by putting incomplete input data 92 into correct format by means of association. For example, if the input data represent only the place where the picture was taken, the season when the picture was taken, and the person whose picture was taken, the data storage network 7 presumes other relevant information by association. The information gained by association is added to the input data constituting the output data 96.

Reference numeral 98 is a processing parameter correction signal sent from the data retrieval network 8 to the data storage network 7. When input data 92 are vague, the output data 96 are not necessarily correct. In such a case, the data retrieval network 8 evaluates the output data 96 and outputs a correction signal accordingly.

For example, the contents of the output data 96 may show that the date on which the picture was taken is April 1 whereas the designated season is autumn, or that the person who took the picture is the same as the person whose picture was taken. In such cases, the data retrieval network 8 judges the output data 96 to be inconsistent. The data retrieval network 8 then outputs the correction signal 98 for changing the threshold value of the output neuron that is the source of the inconsistency in the data storage network 7.

Figure 7:
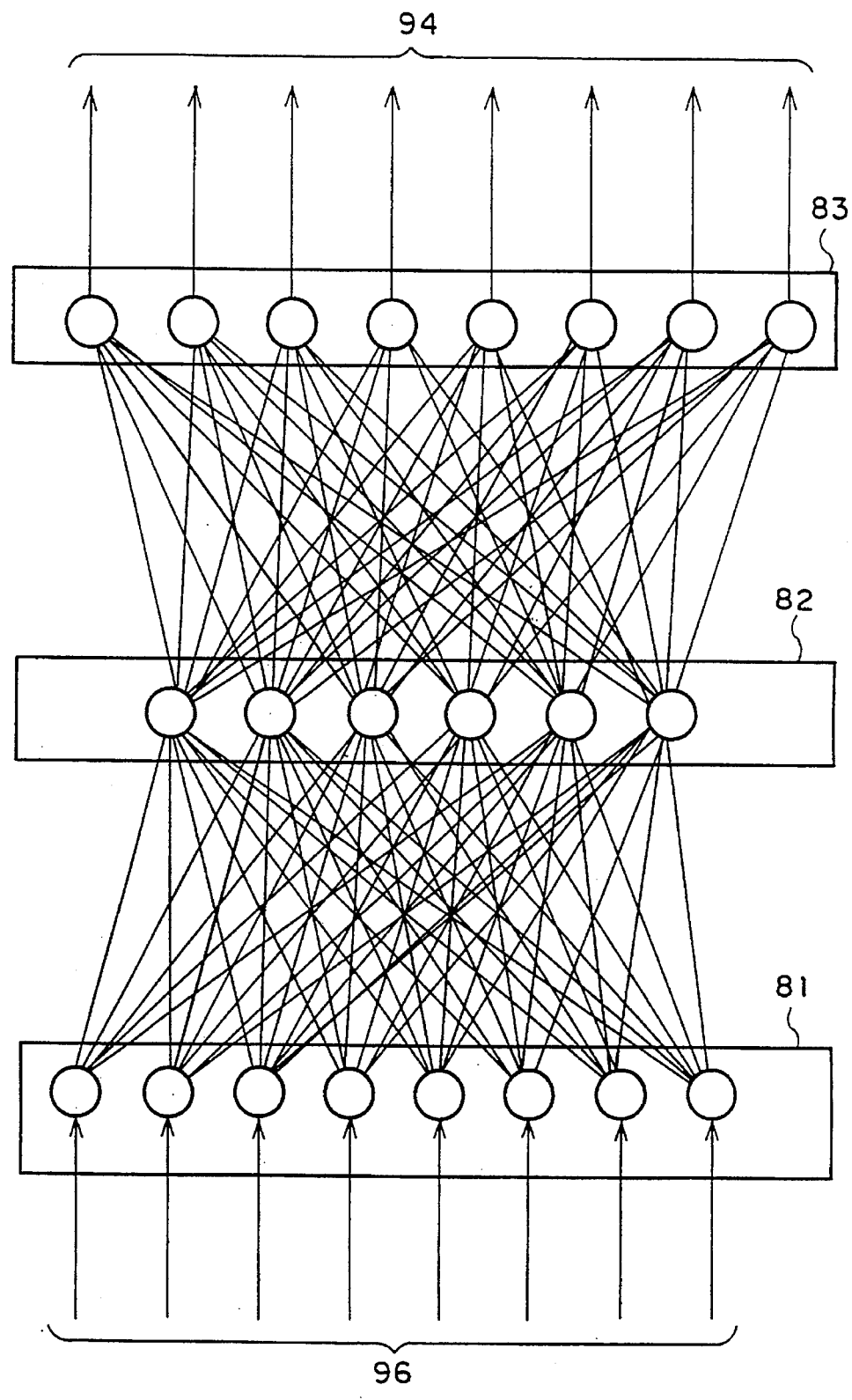
FIG. 7 is a view depicting a typical data retrieval neural network constitution in connection with the invention.

In response, the data storage network 7 changes the threshold value of the output neuron in question and outputs corrected data. The correction process is repeated until there is no inconsistency in the output data 96. The data retrieval network 8 may be implemented by use of conventional database retrieval techniques. Alternatively, as depicted in FIG. 7, the data retrieval network 8 may be implemented by resorting to a multiple layer neural network which has an input layer 81, an intermediate layer 82 and an output layer 83 and which operates on the back propagation learning principle.

The neural network illustrated in FIG. 3 for use as the data storage network in the first and the third embodiments is not limitative of the invention. Alternatively, any of other network types including hop field type, Boltzmann machine type, and multiple layer feed forward type may be used as the data storage network. The same also applies to the data retrieval network for use with the invention.

Although the above-described embodiments deal primarily with the retrieval of pictures, they are not limitative of the invention. The information retrieval system according to the invention may also be applied to the retrieval of diverse kinds of data such as business card information and the names and addresses of customers or acquaintances.

As described and according to the first aspect of the invention, the information retrieval system has a neural network structure in which user-input information is categorized and converted to bit strings that in turn cause the output of the data representing the likely information corresponding to the input information. This setup permits retrieval of data of the highest likelihood from the database even when the input information by which to retrieve the data is vague.

According to the second aspect of the invention, the information retrieval system has a neural network structure in which user-input information is categorized and converted to bit strings that cause the output of a plurality of candidates of the data representing the likely information corresponding to the input information. This setup also permits retrieval of data from the database even when the input information by which to retrieve the data is vague, and allows the user to access repeatedly data of the next highest likelihood if the currently retrieved data are not what is desired.

While preferred embodiments of the invention have been described using specific terms, such description is for illustrative purposes only, and it is to be understood that changes and variations may be made without departing from the spirit or scope of the following claims.

What is claimed is:

1. An information retrieval system for retrieving data from a database, said system comprising:

input means for admitting textual input information for designating retrieval of the data from the database, said textual input information being sufficient to at least partially correspond to said data;

conversion means for categorizing said textual input information and for converting the categorized information into input data in bit strings; and a neural network, including at least an input layer for admitting said input data and an output layer for outputting output data indicating those data in said database which correspond to said textual input information, for changing, during a learning process, the weight of connection between said input layer and said output layer when said input data are admitted into said input layer.

2. An information retrieval system according to claim 1, wherein said input means can be used to input a degree of likelihood that the input information is correct and the conversion means provides the input layer of the neural network with a degree of excitation corresponding to said degree of likelihood.

3. An information retrieval system according to claim 1, wherein said neural network comprises:

a data storage network for inputting the bit strings from said conversion means and correcting format by means of association; and a data retrieval network for providing for said data storage network a correction signal for changing a threshold value of output neuron of said data storage network when an output from said data storage network is judged to be inconsistent.

4. An information retrieval system according to claim 1, wherein the output layer of the neural network outputs a plurality of candidates of input data with degrees of likelihood of the candidates.

5. An information retrieval system according to claim 1, wherein the output layer of the neural network outputs a plurality of candidates of output data.

6. An information retrieval system according to claim 5, further comprising selecting means for selecting the plurality of candidates of output data in order responsive to a request on the input means by a user.

* * * * *